United States Patent Office 2,829,142
Patented Apr. 1, 1958

2,829,142
METALLISABLE MONOAZO DYESTUFFS

Achilles Conzetti, Lugano, and Meinrad Hürbin, Basel, Switzerland, assignors to J. R. Geigy A. G., Basel, Switzerland, a Swiss firm No Drawing. Application January 28, 1954
Serial No. 406,881

Claims priority, application Switzerland February 4, 1953

7 Claims. (Cl. 260—199)

The present invention is concerned with new, metallisable monoazo dyestuffs, the chromed grey to olive wool dyeings of which are distinguished by an excellent fastness to light. It is also concerned with a process for the production of these chromium dyestuffs and their use for the fast dyeing of polyamide fibres, in particular of wool, as well as the material dyed with these dyestuffs.

It has been found that new metallisable monazo dyestuffs can be obtained which, in the fastness to light of the chromed wool dyeings are superior to those of the dyestuffs already known, by coupling a diazotised 6-acyl-amino-2-amino-1-hydroxybenzene compound having a substituent usual in azo dyestuffs in the 4-position of the benzene ring—advantageously an electron attracting group—with a 2-hydroxy-acylaminonaphthalene monosulphonic acid coupling in the 1-position. The new dyestuffs correspond to the general Formula I:

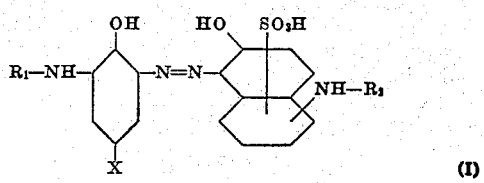

(I)

wherein $R_1$ and $R_2$ represent carbacyl radicals, i. e. radicals of organic acids derived from carbon and X represents a substituent usual in azo dyestuffs.

Because of the better coupling power of the diazo compounds apart from, for example halogen, alkyl and alkoxy groups, those substituents X can be used which are generally regarded as negative, i. e. such groups which, in an inactivated condition, have an attracting inductive influence on the linking pair of electrons between the carbon atom in the 4-position of the benzene ring and X.

Negative substituents usual in azo dyestuffs are, for example, nitro, cyano, keto, sulphonyl, sulphonic acid, sulphonic acid ester, sulphonic acid amide, including sulphonic acid amide groups organically substituted at the nitrogen atom, carboxy, carboxylic acid ester and carboxylic acid amide groups, including derivatives of the latter organically substituted at the nitrogen atom. In water, non-ionogenic groups are to be preferred to the acid water solubilising groups.

The acyl radicals of organic carboxylic acids as well as carbonic acid half ester radicals or carbamic acid radicals can be used as radicals of acids of carbon or as carbacyl radicals in the process described above. These are, for example, the radicals of saturated or unsaturated, unsubstituted or substituted fatty acids, araliphatic, hydrocyclic, aromatic, isocyclic and heterocyclic carboxylic acids which can contain the usual substituents, as well as carbalkoxy radicals, preferably derived from low alcohols and if desired also carbamide radicals derived from low molecular aliphatic secondary amines. As examples can be named the radicals of acetic acid, propionic acid, butyric acid, chloracetic acid, methoxyacetic acid, β-bromo-propionic acid, dimethylacrylic acid, cyclohexane carboxylic acid, phenyl acetic acid, phenoxyacetic acid, benzoic acid, chlorobenzoic acid, furane-2-carboxylic acid and the carbonic acid half ester radicals derived from methyl, ethyl, propyl, butyl, methoxy or ethoxy ethyl alcohol as well as the carbamic acid radicals derived from dimethylamine or diethylamine. In general it is of advantage if an aliphatic carbacyl radical has not more than 5 carbon atoms. The acetyl radical in the diazo component and the carbonic acid half ester radicals of methyl and ethyl alcohol in the coupling component are to be preferred.

Insofar as the diazo components used in the present invention are not already known, they can be easily obtained from the 2-amino-1-hydroxybenzene compounds substituted in the 4-position by acylating the amino group, nitrating and reducing the nitro group to the amino group. Preferred diazo components are 6-acetylamino-4-nitro-2-amino-1-hydroxybenzene, 6-acetylamino-4-acetyl-2-amino-1-hydroxybenzene, 6-acetylamino-4-alkylsulphonyl-2-amino-1-hydroxybenzenes and 6-acetylamino-2-amino-1-hydroxybenzene-4-sulphonic acid dialkylamides.

Coupling components usable according to this invention are obtained by reacting acid halides or chloroformic acid alkyl esters with the aqueous solutions of the alkali metal salts of 2-hydroxy-acylaminonaphthalene monosulphonic acids coupling in the 1-position of the naphthalene ring, in the presence of agents which buffer the mineral acid such as, for example, sodium acetate. The reaction is maintained until the primary amino group disappears.

As 2-hydroxy-acylaminonaphthalene monosulphonic acids coupling in the 1-position, the following can be used for example in the process according to this invention: the derivatives of 1-amino-7-hydroxynaphthalene-3-, -4- or -5-sulphonic acids, 1-amino-6-hydroxynaphthalene-8-sulphonic acid and, because of the particularly good fastness to light of the monazo dyestuffs attained therewith, preferably derivatives of 2-amino-6-hydroxynaphthalene-8-sulphonic acid.

Diazotisation is performed with sodium nitrite in the cold in the usual manner in a mineral acid aqueous solution or suspension, and the coupling is done in an alkaline solution, if necessary in the presence of tertiary nitrogen bases which accelerate the coupling such as for example, pyridine, picoline, dimethyl or diethyl ethanolamine, triethanolamine.

The monoazo dyestuffs according to this invention are obtained in the form of their water soluble alkali salts as dark powders which dye wool from acid dyebaths in bordeaux red to red-violet shades. On after chroming, the dyeings become grey to olive green in shade and are very fast, in particular they have excellent fastness to light.

The following examples illustrate the invention without limiting it in any way. Where not otherwise stated, parts are given as parts by weight and the temperatures are in degrees centigrade. The relationship of parts by weight to parts by volume is as that of kilogrammes to litres.

Example 1

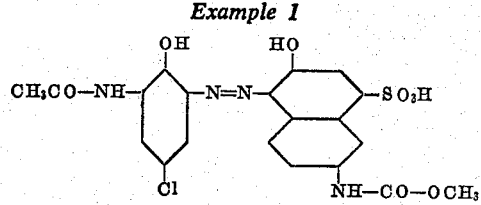

20.05 parts of 6-acetylamino-4-chloro-2-amino-1-hydroxybenzene are diazotised at 0–5° in 200 parts of water and 25 parts of concentrated hydrochloric acid with a solution of 6.9 parts of sodium nitrite in 20 parts of water. The mineral acid reaction is neutralised with sodium bicarbonate and then the yellow diazo suspension is coupled at 0–5° with a solution prepared from 200 parts of water, 29.7 parts of 2-carbomethoxyamino-6-hydroxynaphthalene-8-sulphonic acid, 12 parts of sodium carbonate, 14 parts of 25% ammonia water and 50 parts of pyridine. After stirring for 6 hours at 0–5° and for 16 hours at 20° the coupling is complete. The mixture turns blue and the dyestuff formed separates. The dyestuff is completely precipitated by the addition of 5% of sodium chloride, calculated on the volume, then filtered off under suction and dried. In the form of the sodium salt it is a violet-black powder which dissolves in water with a blue colour which turns red on acidification. The dyestuff dissolves in concentrated sulphuric acid with a fuchsia red colour.

The new dyestuff dyes wool from an acid bath in wine red shades. On after chroming, very fast grey dyeings are obtained, which in particular, have excellent fastness to light.

A dyestuff with very similar properties is obtained, if in the above example, the coupling component is replaced by 28.1 parts of 2-acetylamino-6-hydroxynaphthalene-8-sulphonic acid.

The diazo component is obtained from 6-nitro-4-chloro-2-amino-1-hydroxybenzene by acetylation of the amino group (acetyl derivative M. P. 162°) and reduction of the nitro group to the amino group. (M. P. 159°.)

*Example 2*

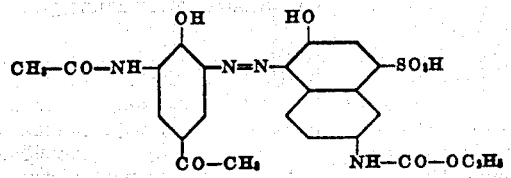

20.8 parts of 6-acetylamino-4-acetyl-2-amino-1-hydroxybenzene are diazotised in 250 parts of water and 25 parts of concentrated hydrochloric acid with a solution of 6.9 parts of sodium nitrite in 20 parts of water at 0–5° by stirring for several hours while slowly adding the nitrite solution, whereupon the mineral acid reaction is neutralised with sodium bicarbonate. The yellow diazo suspension is then mixed with a cold solution prepared by dissolving 31.1 parts of 2-carbethoxyamino-6-hydroxynaphthalene-8-sulphonic acid in 200 parts of water with 6 parts of sodium carbonate and 15 parts of 25% ammonia water and 50 parts of pyridine. The whole is stirred for 10 hours at 0–5° and then for 16 hours at 20°. During the coupling the whole turns blue and the dyestuff formed precipitates as a violet-black powder. The addition of 3% of sodium chloride, calculated on the volume of the coupling mixture, completely precipitates the dyestuff which is then drawn off under suction and dried. In the form of its sodium salt it is a violet-black powder which dissolves in water with a blue and in conc. sulphuric acid with a blue-red colour. The dyestuff dyes wool from an acid bath in red-violet shades. On after-chroming, very fast reddish-grey dyeings are obtained which are distinguished in particular by their very high fastness to light.

Very similar dyestuffs are obtained if in the above example, 29.7 parts of 2-carbomethoxyamino- or 28.1 parts of 2-acetylamino-6-hydroxynaphthalene-8-sulphonic acid are used as coupling component.

The diazo component is obtained from 4-acetyl-2-amino-1-hydroxybenzene by acetylation of the amino group, nitrating in the 6-position of the benzene ring and reducing the nitro group to the amino group.

*Example 3*

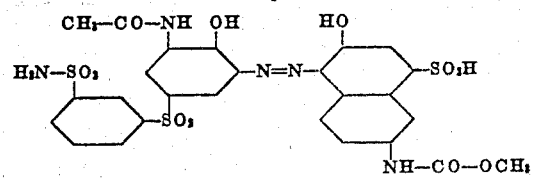

38.1 parts of 6-acetylamino-4-(3'-sulphamido-phenylsulphonyl)-2-amino-1-hydroxybenzene in 400 parts of water and 25 parts of concentrated hydrochloric acid are diazotised at 0–5° by the slow addition dropwise of a solution of 6.9 parts of sodium nitrite in 40 parts of water. The mineral acid reaction is neutralised with sodium bicarbonate and the yellow diazo suspension is mixed with a cold solution made up by dissolving 29.7 parts of 2-carbomethoxyamino-6-hydroxynaphthalene-8-sulphonic acid in 200 parts of water with 6 parts of sodium carbonate, 15 parts of 25% ammonia water and 50 parts of pyridine. The whole is stirred for 10 hours at 0–5° and then for 16 hours at 20° at the end of which time the coupling is complete. The dyestuff, which has almost completely precipitated as a violet-black powder is drawn off under suction and dried. It dissolves in water with a blue and in concentrated sulphuric acid with a ruby red colour. It dyes wool from an acid bath in red-violet shades which, on after chroming, produce very fast greenish-grey dyeings.

A dyestuff which dyes wool in less greenish and more neutral grey shades is obtained if 28.1 parts of 2-acetylamino-6-hydroxynaphthalene-8-sulphonic acid is used as coupling component in the above example.

The diazo component is obtained from 4-chlorodiphenyl sulphone by nitration, sulphonation, conversion of the sulphonic acid group by way of the sulphochloride into the sulphamide group, exchange of the chlorine atom for the hydroxyl group with the aid of caustic alkalies, reduction of the nitro group to the amino group, acetylation of the amino group, nitration and again reduction of the nitro group to the amino group.

*Example 4*

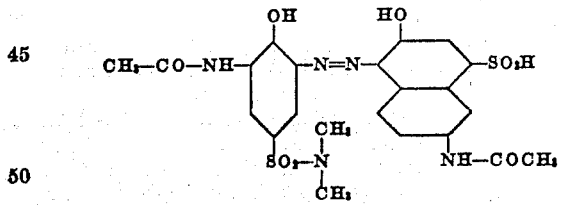

27.3 parts of 6-acetylamino-2-amino-1-hydroxybenzene-4-sulphonic acid dimethylamide in 200 parts of water and 25 parts of concentrated hydrochloric acid are diazotised while stirring at 0–5° by the dropwise addition of a solution of 6.9 parts of sodium nitrite in 20 parts of water. After neutralising the mineral acid reaction with sodium bicarbonate, the yellow diazo suspension is coupled with a cold solution made up by dissolving 28.1 parts of 2-acetylamino-6-hydroxynaphthalene-8-sulphonic acid in 200 parts of water with 6 parts of sodium carbonate and 15 parts of 25% ammonia water and 50 parts of pyridine.

Coupling is performed for 10 hours at 0–5° and the whole is stirred for a further 16 hours at 20° after which the dyestuff is completely precipitated by the addition of 5% of sodium chloride, calculated on the volume of the coupling mixture. The dyestuff is filtered off, washed with 5% salt solution and dried. It is obtained in the form of its sodium salt as a violet blue powder which dissolves in water with a blue and in diluted acids with a red colour. It dyes wool from an acid bath in red-violet shades. On after chroming the acid wool dyeings, very fast grey shades are obtained.

Dyestuffs with similar properties are obtained if in the above example the diazo component is replaced by 30.1 parts of 6-acetylamino-2-amino-1-hydroxybenzene-4-sulphonic acid diethylamide or by 31.5 parts of 6-acetylamino-2-amino-1-hydroxybenzene-4-sulphonic acid morpholide.

These diazo components are obtained by acetylation of the amino group in the corresponding 2-amino-1-hydroxybenzene-4-sulphonic acid amide compounds, nitration and reduction of the nitro group to the amino group.

Example 5

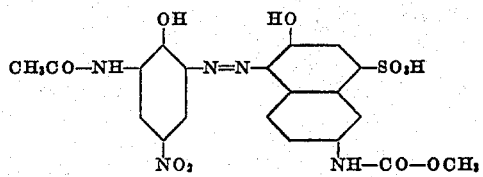

21.1 parts of 6-acetylamino-4-nitro-2-amino-1-hydroxybenzene are stirred into 200 parts of water and 20 parts of concentrated hydrochloric acid and diazotised by the dropwise addition of a solution of 6.9 parts of sodium nitrite in 20 parts of water at 5–7°. The diazo suspension is neutralised by the addition of sodium bicarbonate until there is no longer a mineral acid reaction after which it is mixed at 0–5° with a cold solution prepared by dissolving 29.7 parts of 2-carbomethoxyamino-6-hydroxynaphthalene-8-sulphonic acid and 6 parts of sodium carbonate in 150 parts of water and then adding 8 parts of sodium carbonate, 15 parts of ammonia water 25% and 10 parts of pyridine to the cooled solution. The dyestuff formed precipitates immediately as a black powder and after one hour, the diazo compound has disappeared. The mixture is stirred for another 16 hours at room temperature whereupon the dyestuff is filtered off and dried. It is obtained in the form of its sodium salt as a black powder which dissolves in water with a green-blue colour. On the addition of diluted acids to the aqueous solution it turns a blue-red colour and the dyestuff dissolves in conc. sulphuric acid with a red colour. Wool is dyed from an acid bath in red-violet shades which on after chroming change into very fast olive green shades which have, in particular, excellent fastness to light.

Very similar dyestuffs are obtained if in the above example the coupling component is replaced by 28.1 parts of 2-acetylamino- or by 31.1 parts of 2-carbethoxyamino-6-hydroxynaphthalene-8-sulphonic acid or by 34.1 parts of 6'-hydroxynaphthyl-(2')-methoxyethyl-urethane-8'-sulphonic acid or by 35.5 parts of 6'-hydroxynaphthyl-(2')-ethoxyethyl-urethane-8'-sulphonic acid.

Example 6

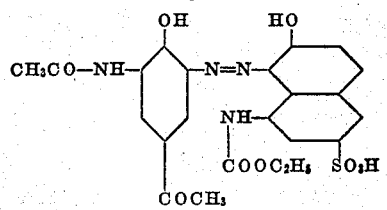

20.8 parts of 6-acetylamino-4-acetyl-2-amino-1-hydroxybenzene are diazotised as described in Example 2 and the yellow diazo suspension is mixed in the cold with the solution of 31.1 parts of carbethoxyamino-7-hydroxynaphthalene-3-sulphonic acid, 6 parts of sodium carbonate, 15 parts of 25% ammonia water and 50 parts of pyridine in 200 parts of water. The coupling is performed for 10 hours at 0–5° and then for 16 hours at 20–25°. The dyestuff which partly precipitates as a violet-black powder while colouring the liquid blue is completely precipitated on completion of the coupling by the addition of sodium chloride. It is drawn off under suction, washed well with 5% sodium chloride solution and dried. The sodium salt of the dyestuff which dissolves well in water with a blue colour dyes wool from an acid bath in red-violet shades. On after chroming the acid wool dyeings, very fast grey shades are obtained which are distinguished by particularly good fastness to light.

Very similar dyestuffs are obtained if, in the above example, 29.7 parts of 1-carbomethoxyamino- or 28.1 parts of 1-acetylamino-7-hydroxynaphthalene-3-sulphonic acid are used as coupling component.

Example 7

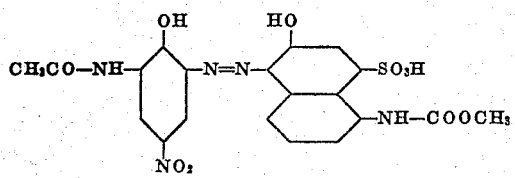

21.1 parts of 6-acetylamino-4-nitro-2-amino-1-hydroxybenzene are diazotised as described in Example 5 and the neutralised diazo suspension is mixed at 0–5° with the solution from 29.7 parts of 1-carbomethoxyamino-6-hydroxynaphthalene-8-sulphonic acid, 14 parts of sodium carbonate, 15 parts of ammonia water 25% and 10 parts of pyridine in 150 parts of ice water. The dyestuff which forms precipitates immediately as a black powder and the diazo compound disappears after 20 hours. The whole is stirred for some hours at room temperature, the dyestuff is then filtered off and dried. In the form of the sodium salt it is a black powder which dissolves in water with a green-blue colour, on the addition of diluted acids with a blue-red colour and in concentrated sulphuric acid with a red colour. Wool is dyed from an acid bath in red-violet shades which on after chroming, change to very fast greenish-grey shades which in particular also have very good fastness to light.

Very similar dyestuffs are obtained if in the above example the coupling component is replaced by 28.1 parts of 1-acetylamino- or 31.1 parts of 1-carbethoxyamino-6-hydroxynaphthalene-8-sulphonic acid or by 34.1 parts of 6'-hydroxynaphthyl-(1')-methoxyethyl- or 35.5 parts of 6'-hydroxynaphthyl-(1')-ethoxyethyl-urethane-8'-sulphonic acid.

Example 8

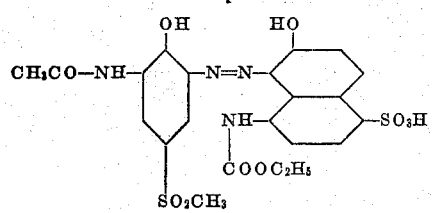

24.4 parts of 6-acetylamino-4-methylsulphenyl-2-amino-1-hydroxybenzene in 200 parts of ice water and 30 parts of 30% hydrochloric acid are diazotised at 0–5° by the dropwise addition of 6.9 parts of sodium nitrite in 20 parts of water. The yellow diazo suspension is neutralised with sodium bicarbonate until congo red paper is no longer coloured blue. It is mixed with the solution from 29.7 parts of 1-carbethoxyamino-7-hydroxynaphthalene-4-sulphonic acid with 6 parts of sodium carbonate in 200 parts of water and 50 parts of pyridine and 20 parts of 25% ammonia water are added. The whole is stirred for 10 hours at 0–10° and then for 24 hours at 20–25°. After the diazo compound has disappeared, the dyestuff, in the form of a dark powder, is precipitated by the slow addition dropwise of a saturated sodium chloride solution. It is drawn off under suction, washed well with 10% sodium chloride solution and dried.

The sodium salt of the dyestuff in the form of a violet-black powder with a bronze tinge dissolves in water with a blue colour and dyes wool from an acid bath in red-violet shades which, on after chroming, change into very fast to light reddish-grey shades.

Very similar dyestuffs are obtained if, in the above example 25.8 parts of 6-acetylamino-4-ethyl-sulphenyl-2-amino-1-hydroxybenzene are used as diazo component and if 28.3 parts of 1-carbomethoxyamino-7-hydroxynaphthalene-4-sulphonic acid are used as coupling component.

Dyestuffs producing greenish-grey chromed wool dyeings are obtained if in the above examples the 1-acylamino-7-hydroxynaphthalene-4-sulphonic acid is replaced by the same number of parts of the corresponding 1-acylamino-7-hydroxynaphthalene-5-sulphonic acid and otherwise the same procedure is followed.

Example 9

100 parts of previously wetted wool are entered at 40–50° into a dyebath containing 3000 parts of water, 1.5 parts of the dyestuff according to Example 1, 10 parts of Glaubers salt and 3 parts of 40% acetic acid. The bath is brought to the boil within 15 minutes and boiled for half an hour. After 15 minutes boiling, 1 part of sulphuric acid is added to exhaust the bath. 0.8 part of potassium chromate are then added and the bath is boiled for a further 40 minutes. This causes the wine red acid dyeing to change to a neutral grey shade which is fixed very fast and in particular is very fast to light.

Grey dyeings are obtained by the same method with the dyestuffs according to Examples 2 to 4 and 6 and 8. The dyestuffs according to Examples 5 and 7 produce olive green to grey-olive dyeings which are also chromium containing wool dyeings which have an excellent fastness to light.

The dyestuffs given in the following table are obtained by methods similar to those described in the Examples 1 to 8. They also dye wool by the after chroming method in very fast shades which in particular are very fast to light.

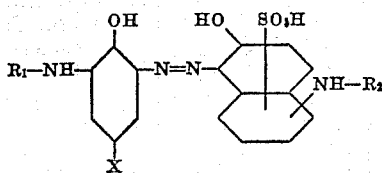

| No. | Diazo component | | Coupling component | | Colour of after chromed wool dyeing |
|---|---|---|---|---|---|
| | $R_1$ | X | $R_2$ | $R_3$<br>$NH:OH:SO_3H$ | |
| 1 | $CH_3CO$ | $COOH$ | $CH_3CO$ | 2.6.8 | Violet-grey. |
| 2 | $CH_3CO$ | $COOH$ | $CH_3OCO$ | 2.6.8 | Do. |
| 3 | $CH_3CO$ | $SO_3H$ | $CH_3OCO$ | 2.6.8 | Reddish-grey. |
| 4 | $CH_3CO$ | $SO_3H$ | $C_4H_9OCO$ | 2.6.8 | Do. |
| 5 | $CH_3CO$ | $SO_2CH_3$ | $C_2H_5OCO$ | 2.6.8 | Grey. |
| 6 | $CH_3CO$ | $SO_2C_2H_5$ | $CH_3OCO$ | 2.6.8 | Do. |
| 7 | $CH_3CO$ | $SO_2C_6H_5$ | $CH_3CO$ | 2.6.8 | Do. |
| 8 | $CH_3CO$ | $SO_2C_6H_5$ | $CH_3OCO$ | 2.6.8 | Reddish-grey. |
| 9 | $CH_3CO$ | $SO_2$–⟨⟩–$SO_3H$ | $CH_3CO$ | 2.6.8 | Do. |
| 10 | $CH_3CO$ | $SO_2$–⟨⟩–$SO_3H$ | $CH_3OCO$ | 2.6.8 | Grey. |
| 11 | $CH_3CO$ | $SO_2NH_2$ | $CH_3OCO$ | 2.6.8 | Do. |
| 12 | $CH_3CO$ | $SO_2$–$N(C_2H_5)(C_6H_5)$ | $CH_3CO$ | 2.6.8 | Reddish-grey. |
| 13 | $CH_3CO$ | $SO_2$–$N(C_2H_5)(C_6H_5)$ | $CH_3OCO$ | 2.6.8 | Grey. |
| 14 | $CH_3CO$ | $SO_2$–NH–⟨⟩–COOH | $C_2H_5OCO$ | 2.6.8 | Do. |
| 15 | $CH_3OCO$ | $NO_2$ | $CH_3OCO$ | 2.6.8 | Olive green. |
| 16 | ⟨⟩–CO | $SO_3H$ | $CH_3OCO$ | 2.6.8 | Reddish-grey. |
| 17 | $CH_3CO$ | $CH_3$ | $CH_3OCO$ | 2.6.8 | Blue-grey. |
| 18 | $CH_3CO$ | $OCH_3$ | $CH_3OCO$ | 2.6.8 | Do. |
| 19 | $CH_3CO$ | CO–⟨⟩ | $CH_3CO$ | 2.6.8 | Reddish-grey. |
| 20 | $CH_3CO$ | CO–⟨⟩ | $CH_3OCO$ | 2.6.8 | Do. |
| 21 | $C_3H_7CO$ | $NO_2$ | $CH_3CO$ | 2.6.8 | Olive green. |
| 22 | $CH_3CO$ | $NO_2$ | ⟨⟩–CO | 2.6.8 | Do. |
| 23 | $CH_3CO$ | $NO_2$ | $C_4H_9OCO$ | 2.6.8 | Do. |

| No. | Diazo component R₁ | X | Coupling component R₁ | R₂ NH:OH:SO₃H | Colour of after chromed wool dyeing |
|---|---|---|---|---|---|
| 24 | CH——CH ‖ CH C—CO \O/ | NO₂ | CH₃CO | 2.6.8 | Do. |
| 25 | CH₃CO | NO₂ | Cl—CH₂CO | 2.6.8 | Olive grey. |
| 26 | CH₃CO | NO₂ | Br—CH₂—CH₂CO | 2.6.8 | Do. |
| 27 | CH₃\C=CH₂CO /CH₃ | NO₂ | CH₃CO | 2.6.8 | Olive. |
| 28 | CH₃CO | NO₂ | Cl—⟨ ⟩—CO | 2.6.8 | Olive grey. |
| 29 | CH₃CO | NO₂ | ⟨ ⟩—CH₂—CO | 2.6.8 | Do. |
| 30 | CH₃CO | Cl | ⟨ ⟩—CO | 2.6.8 | Reddish-grey. |
| 31 | CH₃CO | Cl | ⟨ ⟩—OCH₂CO | 2.6.8 | Do. |
| 32 | CH₃CO | NO₂ | CH——CH ‖ CH C—CO \O/ | 2.6.8 | Olive. |
| 33 | Br—CH—CH₂—CO | NO₂ | CH₃—CO | 2.6.8 | Do. |
| 34 | CH₃—CO | NO₂ | CH₃\N—CO /CH₃ | 2.6.8 | Do. |
| 35 | CH₃—CO | Cl | C₂H₅\N—CO /C₂H₅ | 2.6.8 | Grey. |
| 36 | CH₃—CO | C₂H₅CO | CH₃O—CO | 1.7.3 | Do. |
| 37 | CH₃—CO | CH₃SO₂ | CH₃O—CO | 1.7.3 | Do. |
| 38 | CH₃—CO | C₂H₅SO₂ | CH₃O—CO | 1.7.3 | Do. |
| 39 | CH₃—CO | NO₂ | C₂H₅OCO | 1.7.3 | Pure olive. |
| 40 | CH₃—CO | CH₃SO₂ | C₂H₅OCO | 1.6.8 | Reddish-grey. |

All the dyestuffs Nos. 1 to 40 listed in the above table dissolve in water with a blue colour and in concentrated sulphuric acid with a blue-red colour.

What we claim is:

1. A monoazo dyestuff having the general formula:

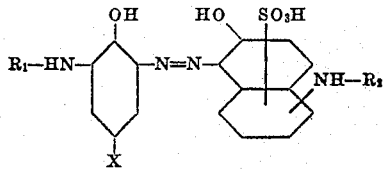

wherein each of $R_1$ and $R_2$ represents a carboxylic acid acyl radical bound directly to the adjacent —NH— group by the —CO— group, the said carboxylic acid containing at most 8 carbon atoms, and X represents a member selected from the group consisting of carboxyl, sulphonic acid, nitro, acetyl, chlorine, methyl, methoxy, methyl sulphonyl, ethyl sulphonyl, phenyl sulphonyl and sulphonic acid amide groups.

2. A monoazo dyestuff having the general formula:

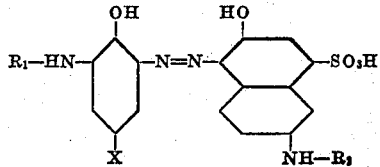

wherein each of $R_1$ and $R_2$ represents a carboxylic acid acyl radical bound directly to the adjacent —NH— group by the —CO— group, the said carboxylic acid containing at most 8 carbon atoms, and X represents a member selected from the group consisting of carboxyl, sulphonic acid, nitro, acetyl, chlorine, methyl, methoxy, methyl sulphonyl, ethyl sulphonyl, phenyl sulphonyl and sulphonic acid amide groups.

3. A monoazo dyestuff having the formula:

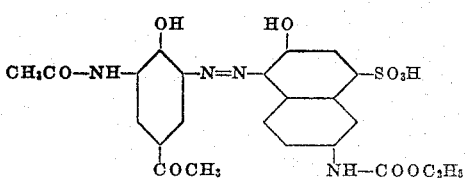

4. A monoazo dyestuff having the formula:

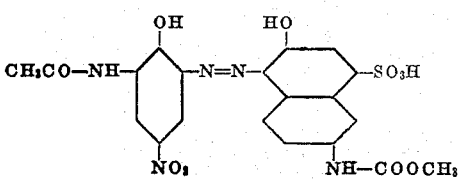

5. A monoazo dyestuff having the formula:
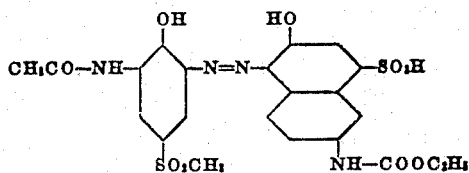
6. A monoazo dyestuff having the formula:
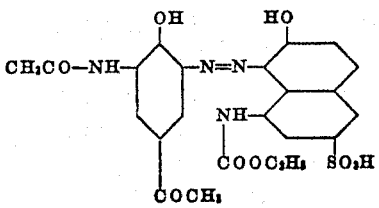
7. A monoazo dyestuff having the formula:
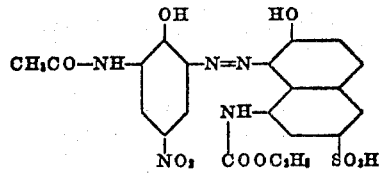
References Cited in the file of this patent
UNITED STATES PATENTS
| | | |
|---|---|---|
| 2,074,225 | Krebser | Mar. 16, 1937 |
| 2,276,174 | Fleischhauer et al. | Mar. 10, 1942 |
| 2,610,175 | Widmer et al. | Sept. 9, 1952 |